Oct. 23, 1923.

W. A. WRIGHT

HAIR TRIMMING GAUGE

Filed Sept. 15, 1922

1,471,768

Inventor,
William A. Wright
By Hazard and Miller
ATTORNEYS

Patented Oct. 23, 1923.

1,471,768

UNITED STATES PATENT OFFICE.

WILLIAM A. WRIGHT, OF LOMPOC, CALIFORNIA.

HAIR-TRIMMING GAUGE.

Application filed September 15, 1922. Serial No. 588,424.

*To all whom it may concern:*

Be it known that I, WILLIAM A. WRIGHT, a citizen of the United States, residing at Lompoc, in the county of Santa Barbara, and State of California, have invented new and useful Improvements in Hair-Trimming Gauges, of which the following is a specification.

My invention relates to and has for its purpose the provision of a device of simple and inexpensive construction which is adapted to be applied to the head to act as a gauge or guide in effecting the trimming of the hair evenly and at a predetermined length both at the front and rear of the head as in the "Columbus" or "Dutch" type of haircut.

Although I will herein show and describe only one form of hair trimming gauge and will point out the novel features thereof in the accompanying claims, it is to be understood that various changes and modifications may be made therein without departing from the spirit of the invention and the spirit and scope of the appended claims.

In the accompanying drawings.

Figure 1:
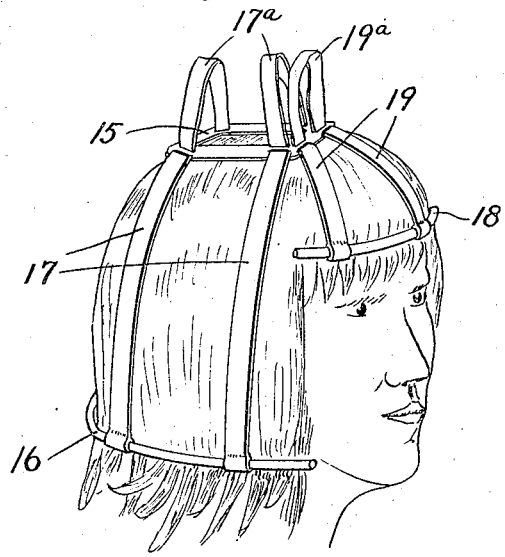
Figure 1 is a view showing in perspective one form of hair trimming gauge embodying my invention in applied position upon the head.

Referring specifically to the drawings, in which similar reference characters refer to similar parts, my invention, in its present embodiment, comprises a plate or yoke 15 from which is adapted to be suspended a gauge member 16 by means of flexible members 17 connected to the gauge member and adjustably associated with the plate 15 to permit of the gauge member being suspended at different levels. The second gauge member 18 is also adapted to be suspended from the plate 15 by means of flexible members 19 which are also adjustably associated with the plate so as to suspend the gauge member at different levels.

Figure 2:
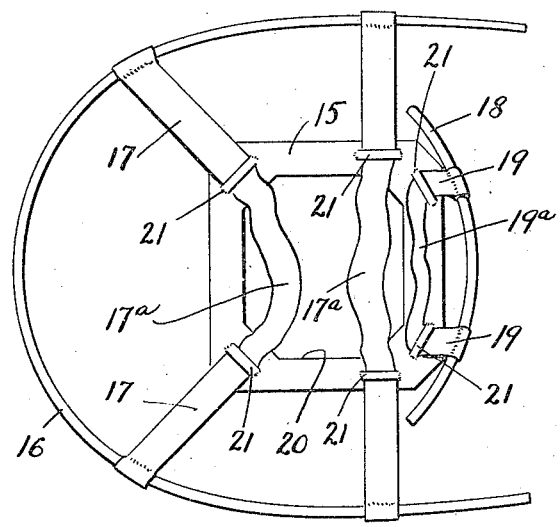
Figure 2 is a top plan view of the gauge shown in Figure 1.

The plate 15 in the present instance is shown as provided with an opening 20 which, in the applied position of the plate to the head, receives the crown of the head. As shown in Figure 1, the plate 15 is curved to conform to the curvature of the crown of the head so as to snugly fit the latter and thereby prevent accidental displacement of the same. As shown in Figure 2, the plate 15 is slotted to provide adjusting bars 21, and the flexible members 17 and 19 which in the present instance are in the form of tapes are extended through the slots so as to be frictionally engaged by the bars 21 in retaining the tape in any adjusted position. As shown, the gauge member 16 is provided with two lengths of tape 17 which are secured at their terminals to the gauge member while their intermediate portions are trained through the slots of the plate so as to provide loops 17ª above the plate. These loops are adapted to be gripped in effecting an adjustment of the two lengths of tape to position the gauge member 16 at the desired level. Similarly, the gauge member 18 is supported by a single length of tape 19, the ends of which are connected to the gauge member while the intermediate portion thereof is trained through certain of the slots of the plate to provide a loop 19ª which is adapted to be gripped in effecting an adjustment of the gauge member 18.

The gauge members 16 and 18 are preferably formed of metallic rods, and as shown in Figure 2, the gauge member 16 is substantially of U-formation, while the gauge member 18 is of arcuate form. The formation of the gauge member 16 is such that in the applied position of the trimming gauge it extends over one cheek rearwardly around the back of the head to the other cheek. The gauge member 18 is curved to conform to the contour of the forehead and is designed for use in the trimming of the bangs. In practice, the trimming gauge is applied to the head in the manner shown in Figure 1 with the plate 15 resting upon the crown of the head and the gauge members 16 and 18 suspended from the latter through the medium of the flexible members 17 and 19. The gauge members 16 and 18 may be caused to occupy any desired position in acting as a guide for the trimming of the hair at a predetermined length, and it will be understood that in the actual cutting of the hair the shears are applied along the lower edges of the gauge members 16 and 18, so that an accurate trimming of the hair can be effected.

I claim as my invention:

1. A hair trimming gauge comprising a pair of curved rods, a plate adapted to engage the crown of the head, and flexible members for suspending the rods from the plate, said plate being formed with slots to provide friction bars for adjustably connecting the flexible members to said plate.

2. A hair trimming gauge comprising a pair of gauge members, a member adapted to engage the crown of the head, and flexible members suspending the gauge members from the member, said crown engaging member being provided with means for adjustably connecting the flexible members to said member.

3. A hair trimming gauge comprising a pair of curved rods, a plate adapted to engage the crown of the head and formed with slots to provide friction bars, and flexible members having their intermediate portions trained through said slots to be engaged by said bars, and their ends connected to said rods.

4. A hair trimming gauge comprising a pair of curved rods, a plate adapted to engage the crown of the head and formed with slots to provide friction bars, two flexible members secured at their ends to one of said rods and trained through certain of the slots of said plate, and a third flexible member connected at its ends to the other rod and having its intermediate portions trained through the remaining slots, all of said flexible members adapted to be engaged by said friction bars for adjustably connecting the members to said plate.

In testimony whereof I have signed my name to this specification.

WILLIAM A. WRIGHT.